United States Patent
Kirkpatrick et al.

[11] Patent Number: 6,151,975
[45] Date of Patent: Nov. 28, 2000

[54] POWER TAKE-OFF UNIT HOUSING HAVING INTEGRAL HYDRAULIC MANIFOLD

[75] Inventors: Chad A. Kirkpatrick, Olive Branch, Miss.; Kudlip Raina, Collierville, Tenn.; Brian L. Rang, Olive Branch; Russell K. Warner, Nesbit, both of Miss.

[73] Assignee: Dana Corporation, Toledo, Ohio

[21] Appl. No.: 09/275,986

[22] Filed: Mar. 25, 1999

[51] Int. Cl.[7] .................................................. F16D 67/04
[52] U.S. Cl. .................................................. 74/11; 74/335
[58] Field of Search ........................................ 74/11, 335

[56] References Cited

U.S. PATENT DOCUMENTS

| | | | |
|---|---|---|---|
| 3,516,525 | 6/1970 | Skaggs | 74/11 |
| 4,411,345 | 10/1983 | Haight et al. | 74/11 |
| 5,103,953 | 4/1992 | Nakayama et al. | |
| 5,237,883 | 8/1993 | Churchill et al. | 74/11 |
| 5,299,129 | 3/1994 | Uchida et al. | 74/11 |
| 5,415,257 | 5/1995 | Shimamura et al. | |
| 5,437,355 | 8/1995 | Takagi et al. | |
| 5,806,640 | 9/1998 | Kale | 74/11 |

*Primary Examiner*—Dirk Wright
*Attorney, Agent, or Firm*—MacMillan, Sobanski & Todd, LLC

[57] ABSTRACT

A power take-off unit and hydraulic control system includes an external manifold having a plurality of internal passageways formed therein. Pressurized fluid from a source is supplied to an input port provided on the manifold. A solenoid valve is mounted on the manifold and is selectively operable in a first and second mode modes to control the flow of pressurized fluid therethrough to a clutch actuation port of the power take-off unit. Low pressure fluid is supplied from a low pressure port of the manifold to the power take-off unit so as to provide internal lubricating fluid thereto. A temperature switch and a pressure switch may also be mounted directly on the manifold. A bracket or other mechanism may be provided to mount the manifold on a support surface, such as on a side rail of a frame assembly for the vehicle. Alternatively, the plurality of internal passageways may be formed within a housing for the power take-off unit. Thus, the solenoid valve, the temperature switch, and the pressure switch are all mounted directed on the housing of the power take-off unit, and no external mounting bracket or other mechanism is required.

10 Claims, 7 Drawing Sheets

POWER TAKE-OFF UNIT HOUSING HAVING INTEGRAL HYDRAULIC MANIFOLD

BACKGROUND OF THE INVENTION

This invention relates in general to power take-off units for selectively providing rotational power to a driven accessory provided on an engine driven vehicle. More specifically, this invention relates to an improved structure for a housing for such a power take-off unit that has a hydraulic manifold formed integrally therein.

Power take-off units are well known mechanical devices that are commonly used in conjunction with sources of rotational energy, such as vehicle engines and transmissions, for rotatably driving driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like.

A typical power take-off unit includes a rigid housing that is mounted on a case of a transmission of the vehicle. The mating surfaces of the housing of the power take-off unit and the case of the transmission having relatively large openings formed therethrough. The housing of the power take-off unit rotatably supports an input gear, an output gear that meshes with the input gear, and an output shaft that is adapted to be connected to the driven accessory. A portion of the input gear extends outwardly through the openings in the housing of the power take-off unit and the case of the transmission into meshing engagement with one of the transmission gears that is constantly driven by the vehicle engine. As a result, the input gear and the output gear of the power take-of unit are constantly rotatably driven by the transmission gear and, thus, the engine of the vehicle.

In some instances, the output gear is directly connected to the output shaft such that the output shaft is also constantly rotatably driven. In other instances, however, a clutch assembly is provided for selectively connecting the output gear to the output shaft to permit intermittent operation of the driven accessory. Alternatively, a plurality of differently sized input and output gears may be supported within the housing of the power take-off unit so as to provide a plurality of speed reduction gear ratios between the input gear and the output shaft. In those instances, the clutch assembly facilitates shifting between these various gear ratios.

In those power take-off units having a clutch assembly, a hydraulic control system is often provided to control the operation thereof. A typical hydraulic control system utilizes pressurized fluid from the transmission to selectively engage and disengage the clutch assembly. To accomplish this, it is known to connect a solenoid valve between a high pressure fluid port of the transmission and a clutch actuation port of the power take-off unit. When it is desired to enable operation of the driven accessory, the solenoid valve is opened to permit fluid communication between high pressure fluid port of the transmission and the clutch actuation port of the power take-off unit. In response to the application of the high pressure fluid, the clutch assembly is engaged to cause operation of the driven accessory. When it is desired to disable operation of the driven accessory, the solenoid valve is closed to prevent fluid communication between high pressure fluid port of the transmission and the clutch actuation port of the power take-off unit. In response to the removal of the high pressure fluid, the clutch assembly is disengaged to prevent operation of the driven accessory.

In the past, the solenoid valve has been provided as a separate component from both the transmission and the power take-off unit. Thus, known solenoid valves have been mounted on other portions of the vehicle, usually on a side rail of a frame assembly for the vehicle. However, such mounting on the vehicle frame assembly usually required that one or more mounting holes be drilled or otherwise formed through the side rail, which was not only time consuming but also could undesirably weaken the side rail. Furthermore, several flexible hoses were usually required to be connected between the transmission, the solenoid valve, and the power take-off unit. The use of such hoses further complicated the installation process and undesirably increased the amount of space required to be provided. Thus, it would be desirable to provide an improved structure for a power take-off unit that avoids these problems.

SUMMARY OF THE INVENTION

This invention relates to an improved structure for a power take-off unit and hydraulic control system that is simple and inexpensive to install and operate. In a first embodiment of the invention, pressurized fluid from a source is supplied to an input port provided on an external manifold having a plurality of internal passageways formed therein. A solenoid valve is mounted on the manifold and is selectively operable in a first and second mode modes to control the flow of pressurized fluid therethrough to a clutch actuation port of the power take-off unit. Low pressure fluid is supplied from a low pressure port of the manifold to the power take-off unit so as to provide internal lubricating fluid thereto. A temperature switch and a pressure switch may also be mounted directly on the manifold. A bracket or other mechanism may be provided to mount the manifold on a support surface, such as on a side rail of a frame assembly for the vehicle. In a second embodiment, the plurality of internal passageways are formed within a housing for the power take-off unit. Thus, the solenoid valve, the temperature switch, and the pressure switch are all mounted directed on the housing of the power take-off unit, and no external mounting bracket or other mechanism is required.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
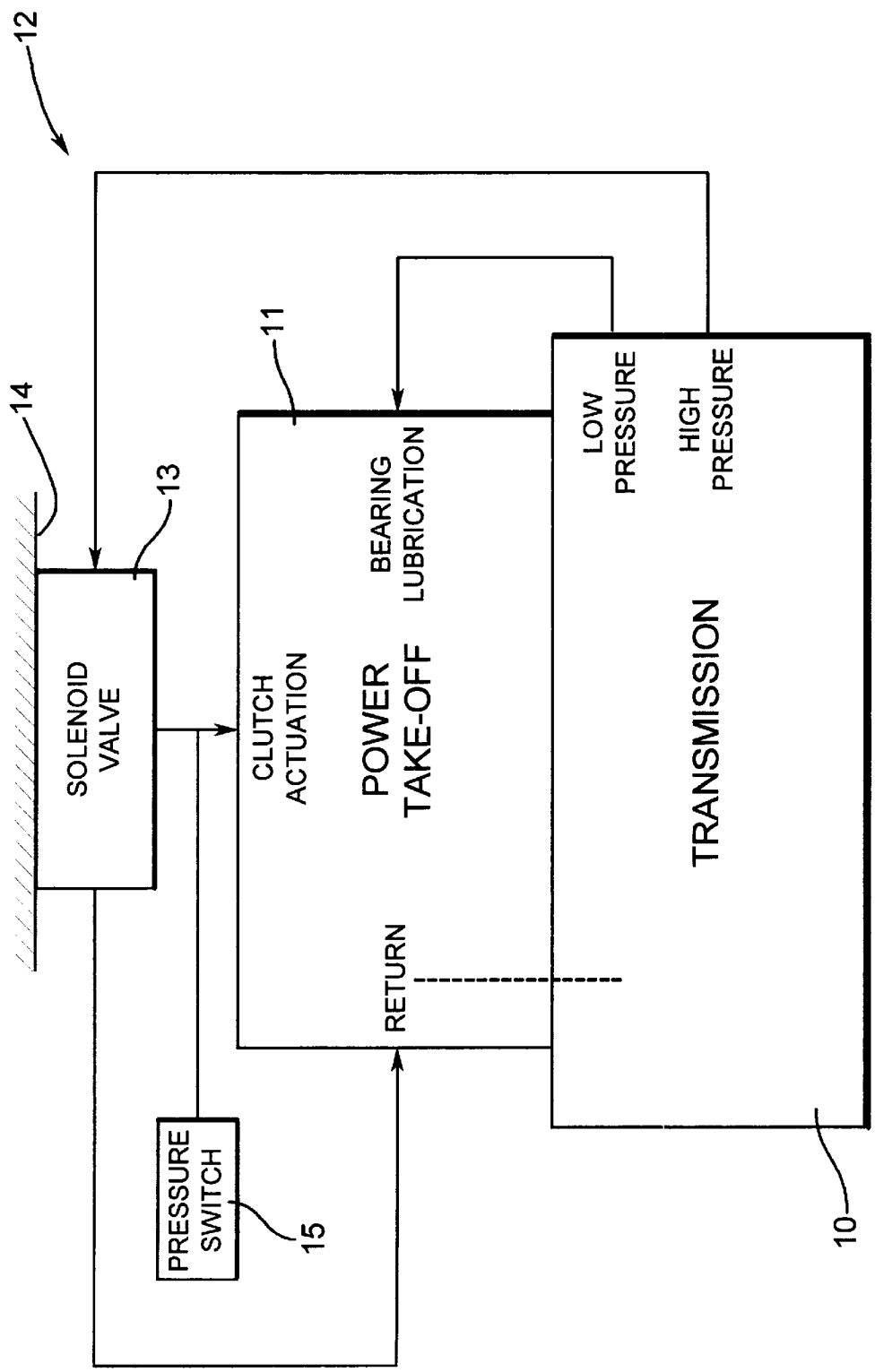
FIG. 1 is schematic diagram of a combined transmission and power take-off unit assembly including a first structure for a hydraulic control system that is known in the art.

Referring now to the drawings, there is illustrated in FIG. 1 a schematic diagram of a combined transmission 10 and power take-off unit 11 assembly including a first structure for a hydraulic control system, indicated generally at 12, that is known in the art. The transmission 10 and the power take-off unit 11 are both well known mechanical structures that can be mounted on a vehicle to selectively operate a driven accessory (not shown), such as a hydraulic pump. Because they are such well known structures, only a brief overview of the operation of the transmission 10 and the power take-off unit 11 is necessary for a full understanding of this invention. The power take-off unit 11 includes a rigid housing (not shown) that is mounted on a case (not shown) of the transmission 10. The mating surfaces of the housing of the power take-off unit 11 and the case of the transmission 10 having relatively large openings formed therethrough. The housing of the power take-off unit 11 rotatably supports an input gear (not shown), an output gear (not shown) that meshes with the input gear, and an output shaft (not shown) that is adapted to be connected to a driven accessory (not shown). A portion of the input gear extends outwardly through the openings in the housing of the power take-off unit 11 and the case of the transmission 12 into meshing engagement with one of the gears (not shown) contained within the transmission 10. As a result, the input gear and the output gear of the power take-of unit 11 are constantly rotatably driven by the transmission 10 whenever the vehicle is operated.

The power take-off unit 11 includes an internal clutch assembly (not shown) for selectively connecting the output gear to the output shaft to permit intermittent operation of the driven accessory. Alternatively, a plurality of differently sized input and output gears may be supported within the housing of the power take-off unit 11 so as to provide a plurality of speed reduction gear ratios between the input gear and the output shaft when the clutch assembly is engaged. In either event, the hydraulic control system 12 utilizes pressurized fluid from the transmission 10 to selectively engage and disengage the clutch assembly. To accomplish this, a solenoid valve 13 is connected between a high pressure fluid port of the transmission 10 and a clutch actuation port of the power take-off unit 11. The operation of the solenoid valve 13 can be controlled manually by an operator or by an electronic controller (not shown). When it is desired to enable operation of the driven accessory, the solenoid valve 13 is opened to permit fluid communication between high pressure fluid port of the transmission 10 and the clutch actuation port of the power take-off unit 11. In response to the application of the high pressure fluid, the clutch assembly is engaged to cause operation of the driven accessory. When it is desired to disable operation of the driven accessory, the solenoid valve 13 is closed to prevent fluid communication between the high pressure fluid port of the transmission 10 and the clutch actuation port of the power take-off unit 11. In response to the removal of the high pressure fluid, the clutch assembly is disengaged to prevent operation of the driven accessory.

As shown in FIG. 1, the solenoid valve 13 is a separate component from both the transmission 10 and the power take-off unit 11. Thus, known solenoid valves 13 have traditionally been mounted on a support surface 14, such as on a side rail of a frame assembly for the vehicle. Consequently, a pair of flexible hydraulic hoses have been required to connect the solenoid valve 13 to the high pressure port of the transmission 10 and to the clutch actuation port of the power take-off unit 11. The hydraulic control system 12 also includes a low pressure port provided on the transmission 10 that is connected through a third flexible hydraulic hose to a bearing lubrication port of the power take-off unit 1. The low pressure fluid from the low pressure port of the transmission 10 is used to provide internal lubricating fluid to the power take-off unit 11 in a known manner. The hydraulic control system 12 further includes a dump port provided on the solenoid valve 13 that is connected through a fourth flexible hydraulic hose to a return port provided on the power take-off unit 11. The dump port allows the fluid from the clutch assembly to drain back through the solenoid valve 13 and return to the power take-off unit 11. The fluid then drains through the power take-off unit 11 to the transmission 10 through aligned internal passageways (indicated by dotted lines) formed in the power take-off unit 11 and the transmission 10.

Lastly, the hydraulic control system 12 includes a pressure switch 15 that is connected between the solenoid valve 13 and the clutch actuation port of the power take-off unit 11. The pressure switch 15 is conventional in the art and is adapted to generate a signal whenever the pressure of the fluid supplied to the clutch actuation port of the power take-off unit 11 exceeds a predetermined magnitude. Typically, this predetermined magnitude is set to be at or near the amount of pressure required to engage the clutch assembly. Thus, the signal from the pressure switch 15 can be used to generate an indication of the operating condition (i.e., engaged or disengaged) of the clutch assembly of the power take-off unit 11.

Figure 2:
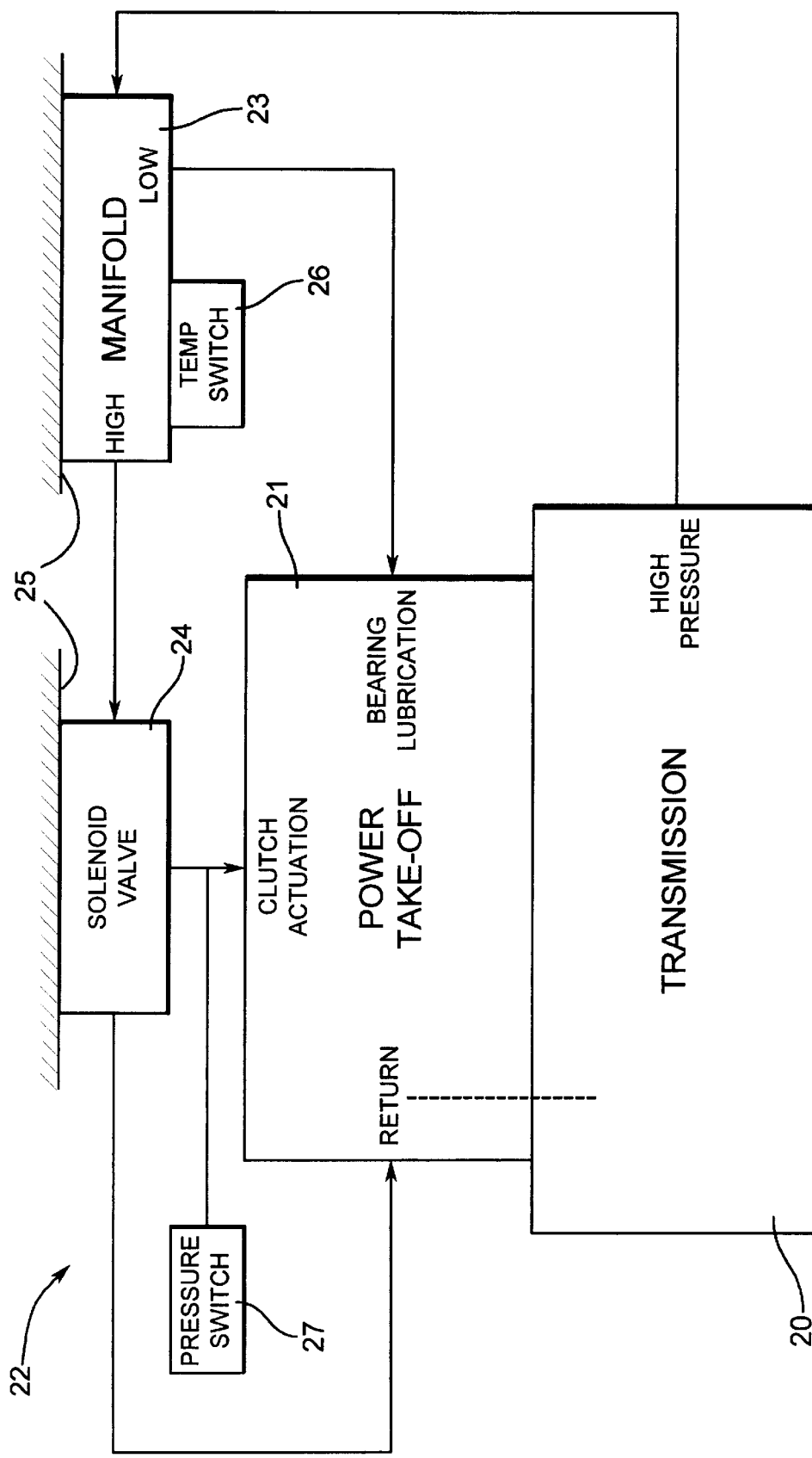
FIG. 2 is schematic diagram of a combined transmission and power take-off unit assembly including a second structure for a hydraulic control system that is known in the art.

Referring now to FIG. 2, there is illustrated a schematic diagram of a combined transmission 20 and power take-off unit 21 assembly including a second structure for a hydraulic control system, indicated generally at 22, that is known in the art. The transmission 20 and the power take-off 21 are, in large measure, identical to the transmission 10 and the power take-off unit 11 described above. The power take-off unit 21 includes an internal clutch assembly (not shown) for selectively connecting the output gear to the output shaft to permit intermittent operation of the driven accessory, and the hydraulic control system 22 utilizes pressurized fluid from the transmission 20 to selectively engage and disengage the clutch assembly. To accomplish this, a high pressure port of the transmission 20 is connected through a flexible hydraulic hose to an input port provided on a manifold 23. The manifold 23 is essentially a block of material having a plurality of internal passageways (not shown) formed therein. A first passageway extends from the input port to a high pressure output port provided on the manifold 23. A second passageway, extends from the first passageway to a low pressure port provided on the manifold 23.

The high pressure port of the manifold 23 is connected by a second flexible hydraulic hose to a solenoid valve 24 that, in turn, is connected to a clutch actuation port of the power take-off unit 11. The operation of the solenoid valve 24 can be controlled as described above to selectively enable and disable operation of the driven accessory. As shown in FIG. 2, the manifold 23 and the solenoid valve 24 are separate components from both the transmission 20 and the power take-off unit 21. Thus, known manifolds 23 and solenoid valves 24 have traditionally been mounted on one or more support surfaces 25, such as on a side rail of a frame assembly for the vehicle.

The hydraulic control system 22 does not include a low pressure port provided on the transmission 20. Rather, low pressure fluid from the low pressure port of the manifold 23 is supplied through third flexible hydraulic hose to provide internal lubricating fluid to the power take-off unit 21 in a known manner. The hydraulic control system 22 further includes a dump port provided on the solenoid valve 24 that is connected through a fourth flexible hydraulic hose to a return port provided on the power take-off unit 21. The dump port allows the fluid from the clutch assembly to drain back through the solenoid valve 24 and return to the power take-off unit 21. The fluid then drains through the power take-off unit 21 to the transmission 20 through aligned internal passageways (indicated by dotted lines) formed in the power take-off unit 21 and the transmission 20.

The hydraulic control system 22 may optionally include a temperature switch 26 that is mounted directly on the manifold 23. The temperature switch 26 can communicate through a third internal passageway formed in the manifold 23 with the first passageway described above. Thus, the temperature switch 26 is responsive to the temperature of the high pressure fluid flowing through the manifold 23. The temperature switch 26 is conventional in the art and is adapted to generate a signal whenever the temperature of the fluid supplied to the solenoid 24 and to the clutch actuation port of the power take-off unit 21 exceeds a predetermined magnitude. Thus, the signal from the temperature switch 26 can be used to disengage the clutch assembly of the power take-off unit 11 or disable the operation of the entire hydraulic control system 22 if the temperature of the hydraulic fluid increases above an acceptable level. Lastly, the hydraulic control system 22 includes a pressure switch 27 that is connected between the solenoid valve 24 and the clutch actuation port of the power take-off unit 21. The pressure switch 27 can function in the same manner as described above.

Figure 3:
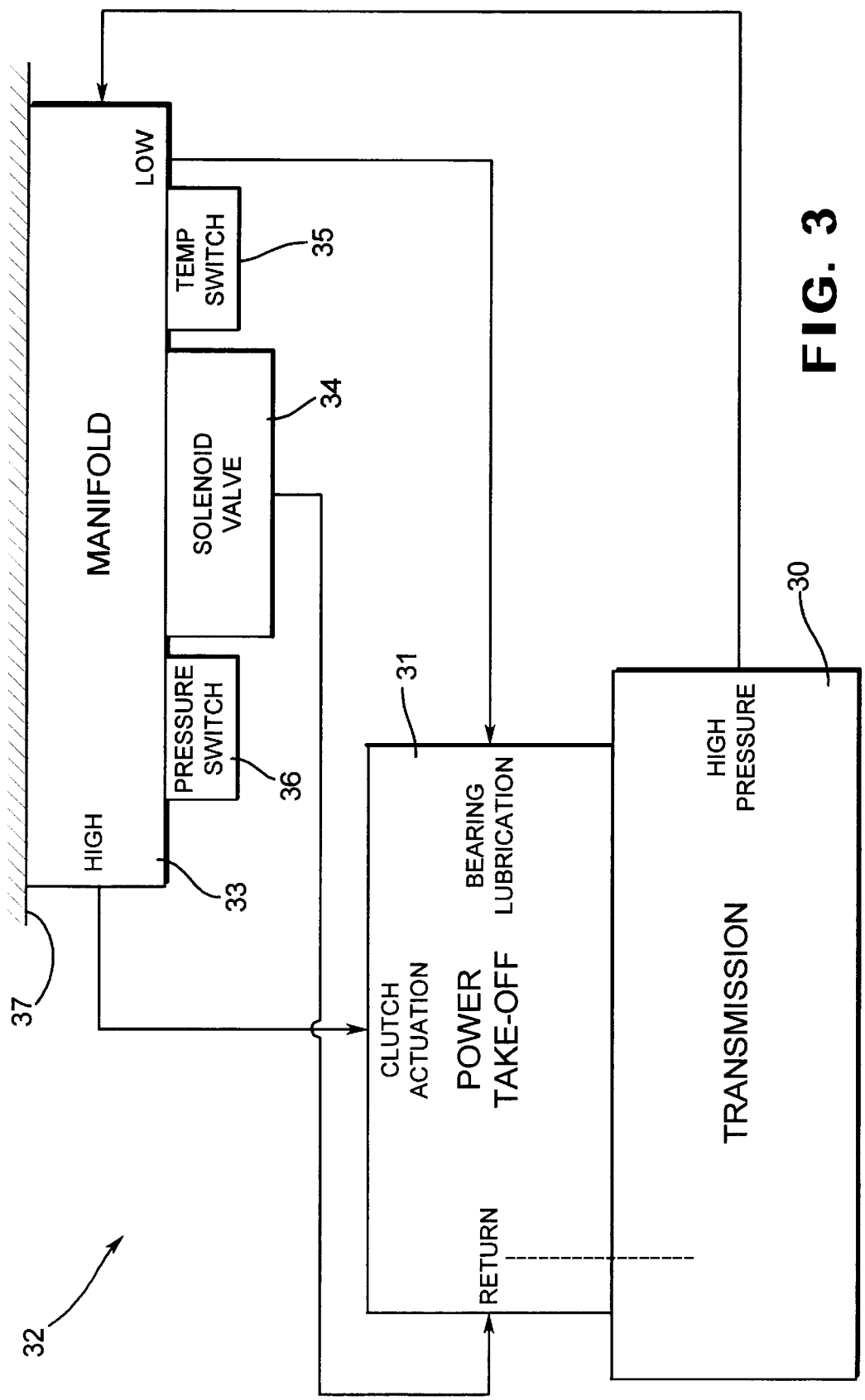
FIG. 3 is schematic diagram of a combined transmission and power take-off unit assembly including a first embodiment for a hydraulic control system in accordance with this invention.

Referring now to FIG. 3, there is illustrated a schematic diagram of a combined transmission 30 and power take-off unit 31 assembly including a first embodiment for a hydraulic control system, indicated generally at 32, in accordance with this invention. The transmission 30 and the power take-off 31 are identical to the transmission 20 and the power take-off unit 21 described above. The power take-off unit 31 includes an internal clutch assembly (not shown) for selectively connecting the output gear to the output shaft to permit intermittent operation of the driven accessory, and the hydraulic control system 32 utilizes pressurized fluid from the transmission 30 to selectively engage and disengage the clutch assembly. To accomplish this, a high pressure port of the transmission 30 is connected through a first flexible hydraulic hose to an input port provided on a manifold 33.

Figure 4:
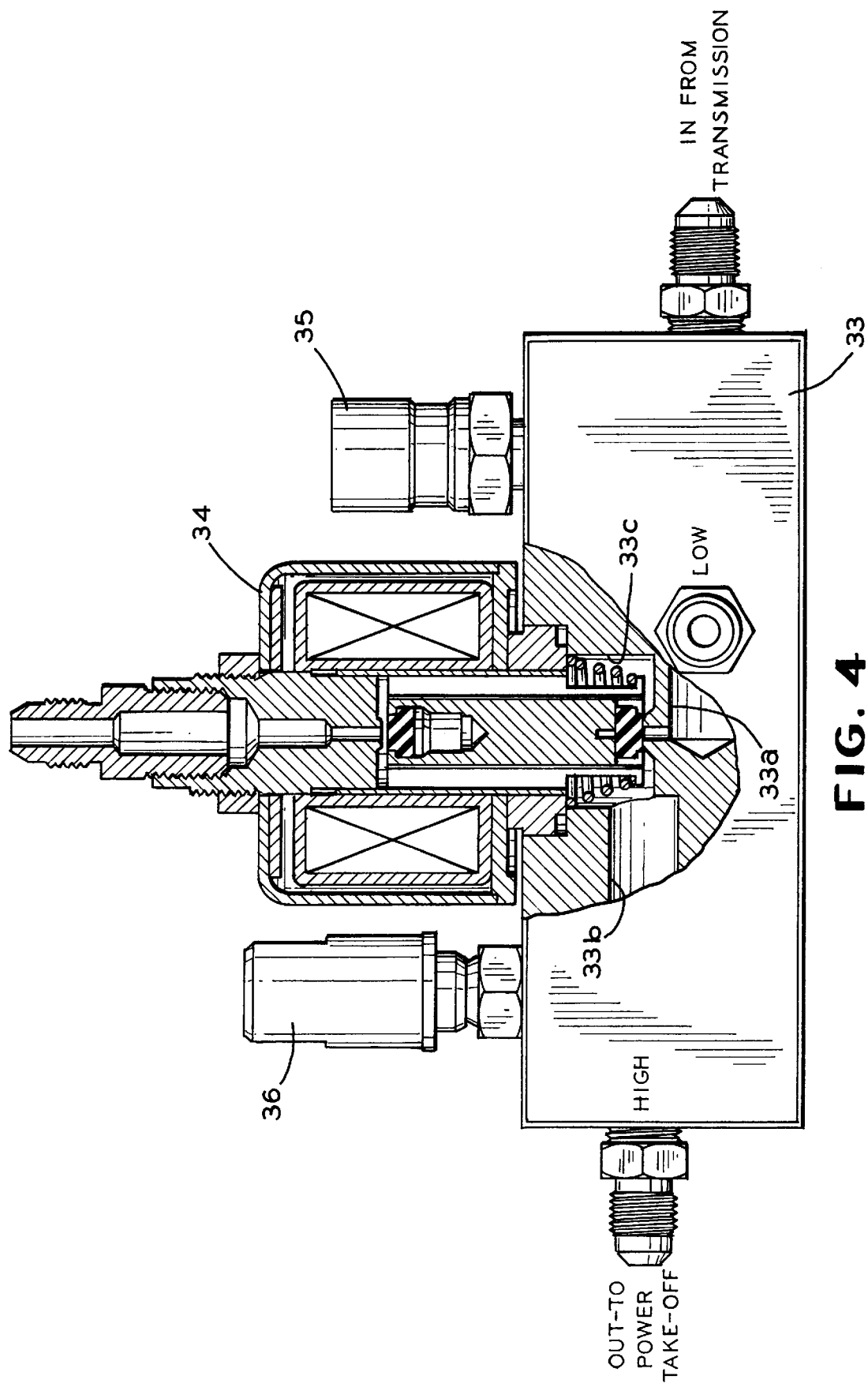
FIG. 4 is an enlarged elevational view, partially in cross section, of the manifold and associated components illustrated in FIG. 3.

The structure of the manifold 33 is illustrated in detail in FIG. 4. As shown therein, the manifold 33 is essentially a block of material having a plurality of internal passageways formed therein. A first 33a passageway extends inwardly from the input port, and a second passageway 33b extends inwardly from a high pressure output port provided on the manifold 33. An internal chamber 33c communicates with both the first passageway 33a and the second passageway 33b. A solenoid valve 34 is mounted on the manifold 33 and extends within the internal chamber 33c. The solenoid valve 34 is, of itself, conventional in the art and is selectively operable in a first mode, wherein fluid communication is permitted between the first and second passageways 33a and 33b, and in a second mode, wherein fluid communication is prevented between the first and second passageways 33a and 33b. The high pressure port of the manifold 33 is connected by a second flexible hydraulic hose to a clutch actuation port of the power take-off unit 31. The operation of the solenoid valve 24 can be controlled as described above to selectively enable and disable operation of the driven accessory.

The hydraulic control system 32 does not include a low pressure port provided on the transmission 30. Rather, low pressure fluid from the low pressure port of the manifold 33 is supplied through third flexible hydraulic hose to provide internal lubricating fluid to the power take-off unit 31 in a known manner. The hydraulic control system 32 further includes a dump port provided on the solenoid valve 34 that is connected through a fourth flexible hydraulic hose to a return port provided on the power take-off unit 31. The dump port allows the fluid from the clutch assembly to drain back through the solenoid valve 34 and return to the power take-off unit 31. The fluid then drains through the power take-off unit 31 to the transmission 30 through aligned internal passageways (indicated by dotted lines) formed in the power take-off unit 31 and the transmission 30. The hydraulic control system 32 may optionally include a temperature switch 35 that is mounted directly on the manifold 33. The temperature switch 35 can communicate through a third internal passageway (not shown) formed in the manifold 33 with the first passageway 33a described above. Thus, the temperature switch 35 is responsive to the temperature of the high pressure fluid flowing through the manifold 33. The temperature switch 35 is conventional in the art and is adapted to generate a signal whenever the temperature of the fluid supplied to the solenoid 34 and to the clutch actuation port of the power take-off unit 31 exceeds a predetermined magnitude. Thus, the signal from the temperature switch 35 can be used to disengage the clutch assembly of the power take-off unit 31 or disable the operation of the entire hydraulic control system 32 if the temperature of the hydraulic fluid increases above an acceptable level. Lastly, the hydraulic control system 32 includes a pressure switch 36 that is mounted directly on the manifold 33. The pressure switch 36 can communicate through a fourth internal passageway (not shown) formed in the manifold 33 with the second passageway 33b described above. Thus, the pressure switch 36 is responsive to the pressure of the high pressure fluid flowing through the manifold 33. The pressure switch 36 is conventional in the art and is adapted to generate a signal whenever the pressure of the fluid supplied to the clutch actuation port of the power take-off unit 31 exceeds a predetermined magnitude. Thus, the signal from the pressure switch 36 can be used as an indication of the operating condition (i.e., engaged or disengaged) of the clutch assembly of the power take-off unit 31.

As shown in FIG. 3, the manifold 33 is a separate component from both the transmission 30 and the power take-off unit 31. Thus, a bracket (not shown) or other mechanism may be provided to mount the manifold on a support surface 37, such as on a side rail of a frame assembly for the vehicle. Although such external mounting is required in this embodiment of the invention, the mounting of the solenoid valve 34, the temperature switch 35, and the pressure switch 36 on the manifold 33 significantly decreases the amount of physical space occupied by the hydraulic control system 32 as compared to the prior art hydraulic control systems 12 and 22 described above, and further facilitates the installation thereof over such prior art systems.

Figure 5:
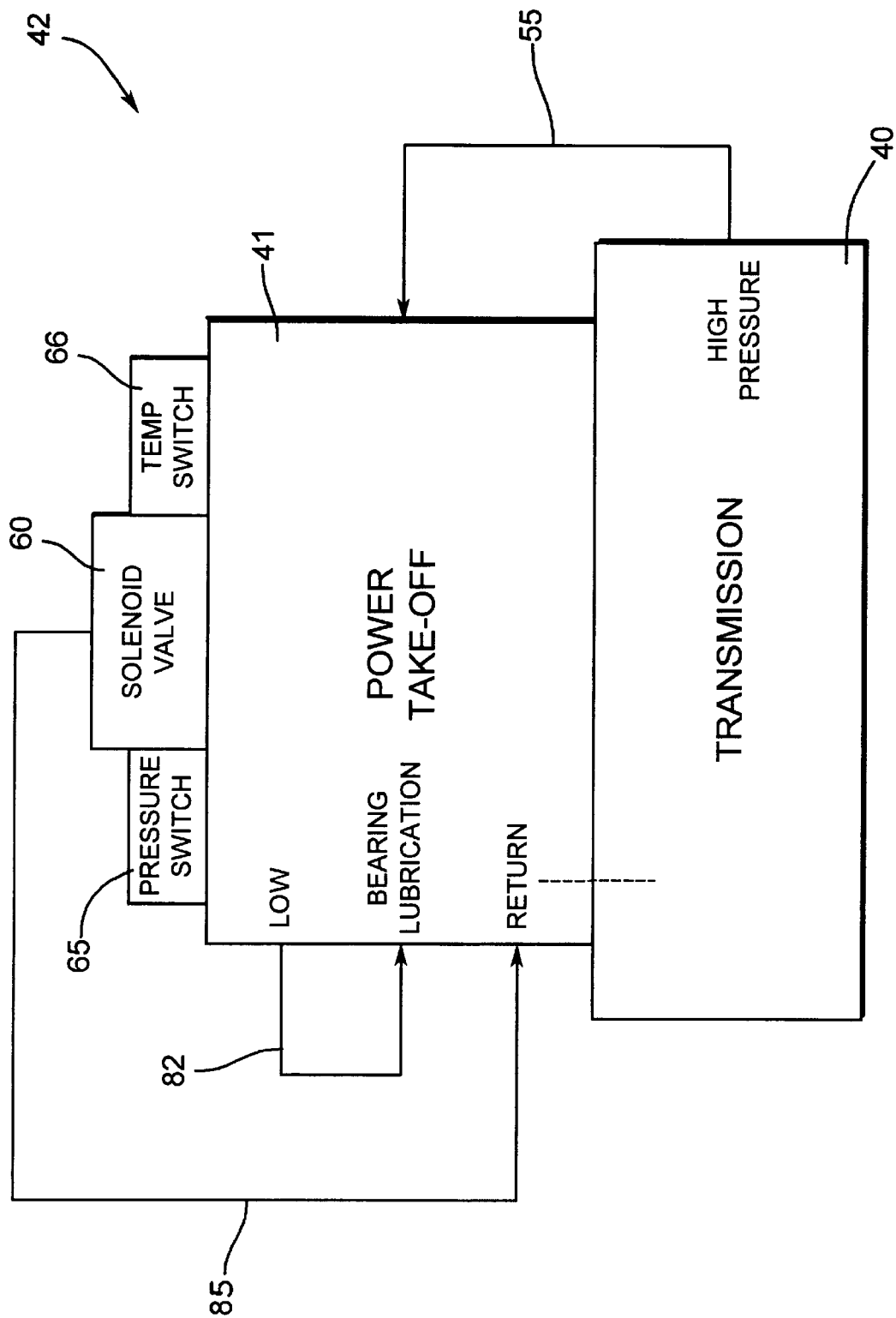
FIG. 5 is schematic diagram of a combined transmission and power take-off unit assembly including a second embodiment for a hydraulic control system in accordance with this invention.

Referring now to FIG. 5, there is illustrated a schematic diagram of a combined transmission 40 and power take-off unit 41 assembly including a second embodiment for a hydraulic control system, indicated generally at 42, in accordance with this invention. The transmission 40 and the power take-off 41 are identical to the transmission 30 and the power take-off unit 31 described above. The power take-off unit 41 includes an internal clutch assembly (see FIG. 8) for selectively connecting the output gear to the output shaft to permit intermittent operation of the driven accessory, and the hydraulic control system 42 utilizes pressurized fluid from the transmission 40 to selectively engage and disengage the clutch assembly. As will be explained in greater detail below, the entire hydraulic control system 42 of this embodiment of the invention is contained within or mounted on a housing of the power take-off unit 41.

Figure 6:
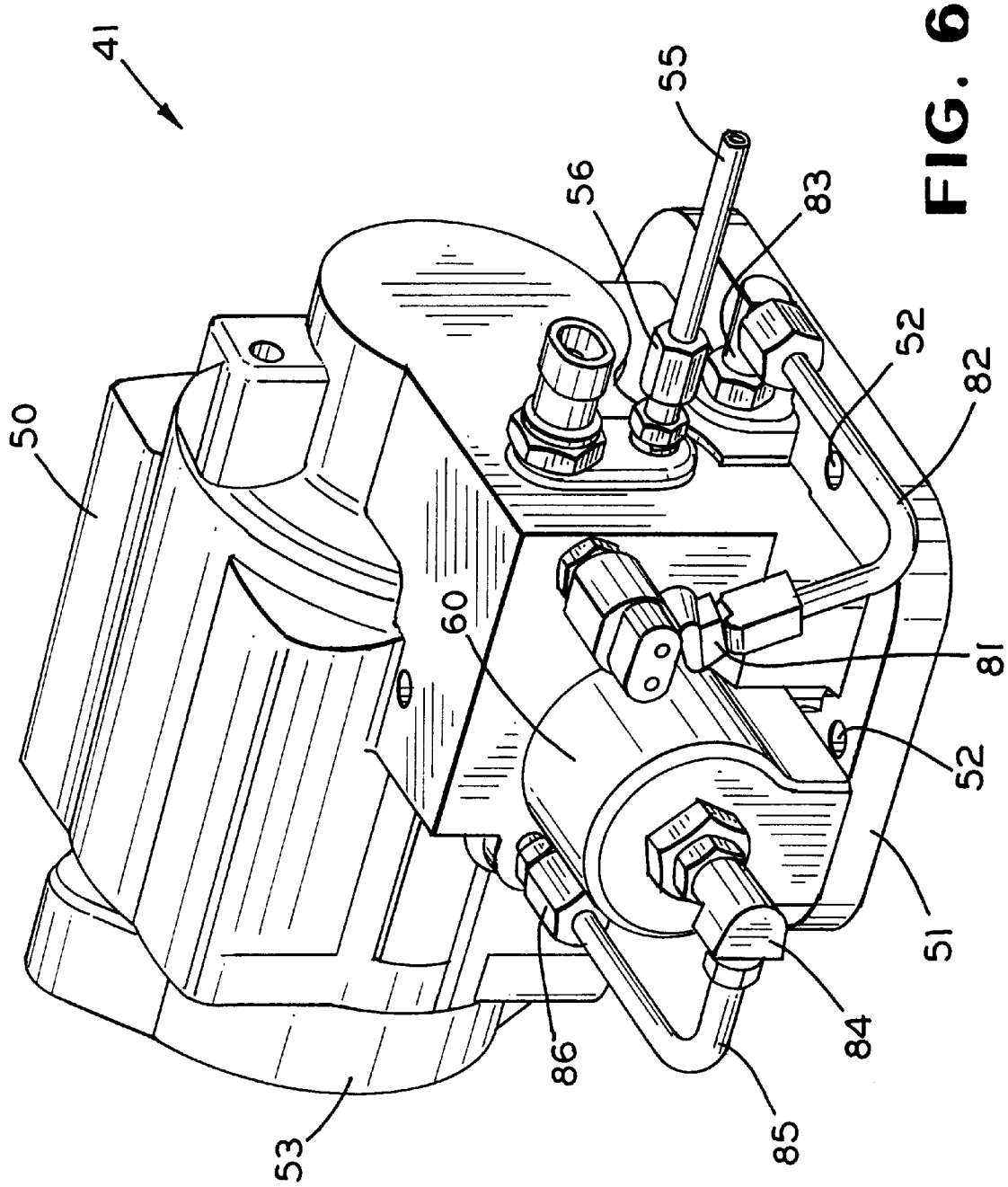
FIG. 6 is a perspective view of the power take-off unit and hydraulic control system illustrated in FIG. 5.

The structure of the power take-off unit 41 is more clearly illustrated in FIG. 6. As shown therein, the power take-off unit 41 includes a housing 50 having a base portion 51. A plurality of apertures 52 (only two are shown) are formed through the base portion 51 of the housing 50 to facilitate the mounting of the power take-off unit 41 on a case (not shown) of the transmission 40, for the purpose described above. A mounting flange 53 may be secured to the housing 50 to facilitate the connection of an accessory device (not shown), such as a hydraulic pump, to the power take-off unit 41 in a manner that is well known in the art.

Figure 7:
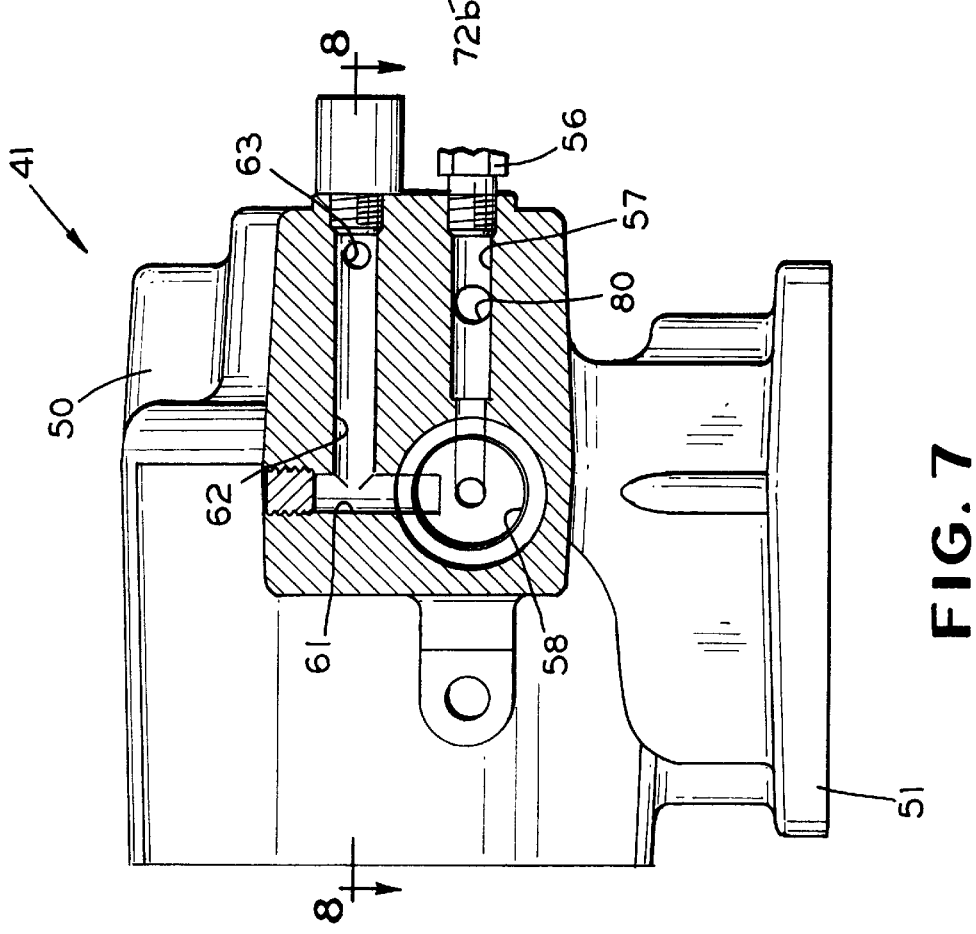
FIG. 7 is an elevational view, partially in cross section, of the power take-off unit and hydraulic control system illustrated in FIG. 6, wherein the pump mounting flange has been removed for the sake of clarity.

A high pressure port of the transmission 40 is connected through a first conduit 55, preferably a rigid metallic tube, through a fitting 56 to an input port provided on the housing 50 of the power take-off unit 41. As shown in FIG. 7, the input port communicates through a first passageway 57 formed within the housing 50 of the power take-off unit 41 to an internal chamber 58. A solenoid valve 60 is directly mounted on the housing 50 of the power take-off unit 41 and extends within the internal chamber 58. The solenoid valve 60 is, of itself, conventional in the art and is selectively operable in a first mode, wherein fluid communication is permitted from the first passageway 57 to a second passageway 61 formed within the housing 50 of the power take-off unit 41, and in a second mode, wherein fluid communication is prevented between the first and second passageways 57 and 61. The second passageway 61 communicates with a third passageway 62 and a fourth passageway 63 formed within the housing 50 of the power take-off unit 41.

The hydraulic control system 42 also includes a pressure switch 65 that is mounted directly on the housing 50 of the power take-off unit 41. The pressure switch 65 communicates with the fourth passageway 63 formed within the housing 50 and, therefore, is responsive to the magnitude of the pressure of the hydraulic fluid therein. The pressure switch 65 is, of itself, conventional in the art and can function in the same manner as described above. The hydraulic control system 22 may optionally include a temperature switch 66 that is also mounted directly on the housing 50 of the power take-off unit 41. The temperature switch 66 communicates with the third passageway 62 formed within the housing 50 and, therefore, is response to the magnitude of the temperature of the hydraulic fluid therein. The temperature switch 66 is, of itself, conventional in the art and can function in the same manner as described above.

Figure 8:
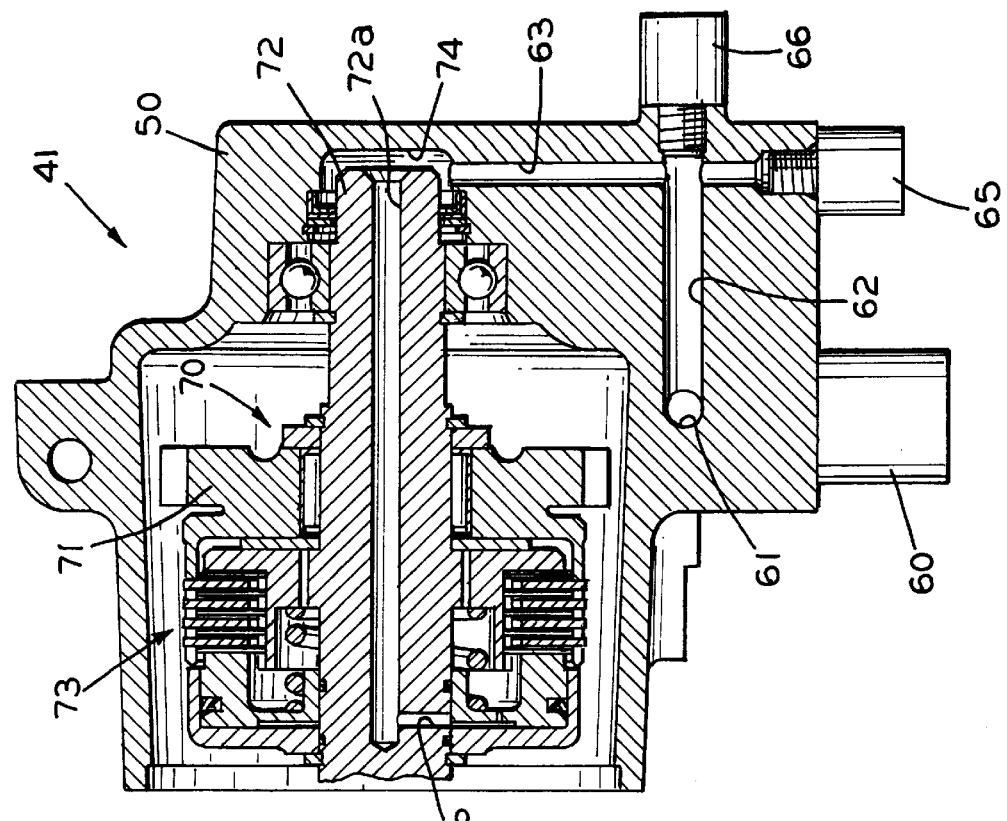
FIG. 8 is a sectional elevational view of the power take-off unit and hydraulic control system taken along line 8—8 of FIG. 7.

As shown in FIG. 8, the fourth passageway 63 communicates with the clutch assembly, indicated generally at 70, disposed within the power take-off unit 41. The clutch assembly 70 includes an output gear 71 that is rotatably driven by an input gear (not shown), an output shaft 72 that is rotatably supported within the housing 50, and a clutch pack assembly, indicated generally at 73. As is well known, the clutch pack assembly 73 is adapted to selectively connect the output shaft 72 for rotation with the output gear 71. When the solenoid valve 60 is operated in the first mode, fluid communication is permitted from the first passageway 57 to the second passageway 61 formed within the housing 50 of the power take-off unit 41. As a result, high pressure hydraulic fluid flows from the transmission 40 through the first passageway 57, the second passageway 61, the third passageway 62, and the fourth passageway 63 to a chamber 74 formed within the housing 50 of the power take-off unit 41 adjacent to one end of the output shaft 72. The high pressure hydraulic fluid flows from the chamber 74 through first and second internal passageways 72a and 72b formed through the output shaft 72 to the clutch pack assembly 73. As a result, the clutch pack assembly 73 is actuated in a manner that is well known in the art to connect the output shaft 72 for rotation with the output gear 71. Conversely, when the solenoid valve 60 is operated in the second mode, fluid communication is not permitted from the first passageway 57 to the second passageway 61 formed within the housing 50 of the power take-off unit 41. As a result, no high pressure hydraulic fluid flows from the transmission 40 to the clutch pack assembly 73. As a result, the clutch pack assembly 73 is actuated to disconnect the output shaft 72 from rotation with the output gear 71.

Referring back to FIGS. 5 and 6, it can be seen that the hydraulic control system 42 does not include a low pressure port provided on the transmission 40. Rather, internal lubricating fluid for the power take-off unit 41 is supplied from a fourth passageway 80 formed within the housing 50 that (as shown in FIG. 7) communicates with the first passageway 57. Thus, pressurized hydraulic fluid flows from the first passageway 57 and the fourth passageway 80 through a fitting 81 mounted on the exterior of the housing 50 and a second conduit 82 (preferably a rigid metallic tube) to a fitting 83 mounted on the exterior of the housing 50. As a result, internal lubricating fluid is constantly supplied to the power take-off unit 41. The hydraulic control system 42 further includes a dump port provided on the solenoid valve 60 that is connected through a fitting 83, a third conduit 84 (preferably a rigid tube) to a fitting 85 mounted on the exterior of the housing 50 at a return port provided on the power take-off unit 41. The dump port allows the fluid from the clutch pack assembly 73 to drain back through the passageways 72b, 72a, 74, 63, 62, and 61 through the solenoid valve 60 and return to the power take-off unit 41. The fluid then drains through the power take-off unit 41 to the transmission 40 through aligned internal passageways (indicated by dotted lines in FIG. 5) formed in the power take-off unit 41 and the transmission 40.

The above-described structure for the power take-off unit 41 assembly and the hydraulic control system 42 provides several significant advantages. First, the physical space occupied by the power take-off unit 41 assembly and the hydraulic control system 42 is much smaller than the previously described structures. Second, because all of the components are contained within or mounted directly on the housing 50 of the power take-off unit 41, the process of installing the power take-off unit 41 assembly and the hydraulic control system 42 is greatly simplified. Third, by eliminating all of the flexible hoses discussed above, the power take-off unit 41 assembly and the hydraulic control system 42 is not as susceptible to damage from heat or impacts.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. A combined power take-off unit and hydraulic control system comprising:

a power take-off unit having a clutch actuation port; and a hydraulic control system including a manifold having an internal passageway formed therethrough from an input port to an output port, said output port communicating with said clutch actuation port of said power take-off unit; and a valve mounted on said manifold and operable in a first mode, wherein communication is permitted between said input port and said output port, and in a second mode, wherein communication is prevented between said input port and said output port.

2. The combined power take-off unit and hydraulic control system defined in claim 1 wherein said manifold is formed as an external member from said power take-off unit.

3. The combined power take-off unit and hydraulic control system defined in claim 2 further including a pressure switch mounted on said manifold for generating an indication of the pressure in said internal passageway.

4. The combined power take-off unit and hydraulic control system defined in claim 2 further including a temperature switch mounted on said manifold for generating an indication of the temperature in said internal passageway.

5. The combined power take-off unit and hydraulic control system defined in claim 2 further including a pressure switch mounted on said manifold for generating an indication of the pressure in said internal passageway and a temperature switch mounted on said manifold for generating an indication of the temperature in said internal passageway.

6. The combined power take-off unit and hydraulic control system defined in claim 1 wherein said power take-off unit includes a housing, and wherein said manifold is provided in said housing of said power take-off unit.

7. The combined power take-off unit and hydraulic control system defined in claim 6 further including a pressure switch mounted on said housing of said power take-off unit for generating an indication of the pressure in said internal passageway.

8. The combined power take-off unit and hydraulic control system defined in claim 6 further including a temperature switch mounted on said housing of said power take-off unit for generating an indication of the temperature in said internal passageway.

9. The combined power take-off unit and hydraulic control system defined in claim 6 further including a pressure switch mounted on said housing of said power take-off unit for generating an indication of the pressure in said internal passageway and a temperature switch mounted on said housing of said power take-off unit for generating an indication of the temperature in said internal passageway.

10. The combined power take-off unit and hydraulic control system defined in claim 1 wherein said valve is a solenoid valve.

* * * * *